3,341,498
POLYURETHANE COATING COMPOSITIONS DERIVED FROM A POLYESTER OF Δ4-TETRAHYDROPHTHALIC ACID AND A POLYOL
Gerald R. Skreckoski, Buffalo, and Maurice E. Bailey, Orchard Park, N.Y., assignors to Allied Chemical Corporation, New York, N.Y., a corporation of New York
No Drawing. Filed Apr. 19, 1963, Ser. No. 274,297
6 Claims. (Cl. 260—75)

This invention relates to novel coating compositions. More particularly, it is directed to air-drying urethane coating compositions derived from a polyisocyanate and a hydroxyl terminated polyester based on Δ4-tetrahydrophthalic anhydride. The new coatings dry rapidly in air, possess excellent strength and solvent resistance.

It is well known in the art to prepare urethane coatings from polyesters and polyisocyanates. Such coatings because of their chemical inertness and generally excellent mechanical properties are much in demand.

Urethane coatings known to the art are of three types. The first is that in which the film forming constituents containing ethylene unsaturation, such as is present in various vegetable drying oils, and which dry in the air by oxidative hardening at the points of unsaturation. The second type is that in which the film forming component(s) contains free isocyanato groups and which dry by reaction with the moisture of the air or with hydroxyl-containing compounds.

The third type is that in which the film forming component(s) is a fully reacted urethane polymer which is essentially linear in character, and which is prepared by reaction of a diisocyanate with a stoichiometric equivalent amount of a difunctional hydroxy terminated saturated polyester. These polymers are prepared and/or applied in strongly polar solvents. The coatings thus dry by solvent evaporation much in the manner of conventional lacquers.

Each of the known types of urethane coatings suffer from one or more deficiencies which are characteristic of the class of the coating. Thus the unsaturated oil-type coatings are characterized by relatively long drying times; the free isocyanato group containing coatings require special handling in order to prevent premature reaction and hence, in general, have relatively short "pot life" ("two-can") or shelf life ("one-can"); and the lacquer type are obviously deficient in solvent (especially polar solvent) resistance.

It is, therefore, a principal object of the present invention to devise novel urethane coating compositions.

Another object is to devise novel urethane coating compositions which are characterized by rapid drying and excellent solvent resistances.

Still another object is to devise novel coating compositions comprising a polyester component based on Δ4-tetrahydrophthalic acid.

Other objects will be obvious from the following description of our invention.

We have made the surprising discovery that polyesters obtained by condensation of a polyhydroxy compound and Δ4-tetrahydrophthalic acid (or anhydride) or mixture thereof with a minor proportion of a polycarboxylic acid so as to give rise to a hydroxyl terminated polyester product, when reacted with a polyisocyanate in substantially stoichiometric equivalent amount and the resultant reaction product, which contains insignificant, if any amounts of free isocyanato and/or hydroxyl groups, is dissolved in a lacquer type solvent, gives rise to a urethane coating composition of excellent characteristics.

The novel compositions of our invention, which can be be applied to a substrate by conventional methods, i.e., by spraying, brushing or dipping, flow coating, and the like, provides coatings which dry with the typical speed of conventional lacquers and, when cured, are highly resistant to solvents and moisture. Moreover, the novel compoistions possess excellent shelf stability, that is they do not increase in viscosity on standing, and hence are well suited for "one-can" formulations. The novel compositions are stable to pigmentation, that is they do not react with or are they susceptible to attack by pigments ordinarily used to color conventional lacquers.

We believe that the use of Δ4-tetrahydrophthalic acid polyesters in accordance with our invention imparts a dual drying mechanism into this novel coating system. Firstly, the coating drys by solvent evaporation at the desirable rate of the conventional lacquer to give a coating which is tack-free and essentially dry throughout. Thereafter chemical cross-linking, analogous to the "drying" of vegetable oils, occurs at the ethylenic double bonds of the tetrahydrophthalic moieties. This latter mechanism occurs at a slower rate than the solvent evaporation but when complete gives rise to a tougher, more solvent resistant film than is obtainable from conventional lacquers and linear non-cross-linked urethane polymers. Thus the novel compositions of our invention because of this subsequent cross-linking ability, develop not only greater strength but also increased solvent resistance on aging. They can be prepared initially at lower degrees of polymerization and thus are usually soluble in less polar and usually less expensive solvents such as ketones, esters and blends thereof with aromatic solvents. The coatings can be applied at higher solids concentration, which can be an additional economic advantage.

In accordance with a preferred mode of preparing the coating compositions of our invention, the polyester based on Δ4-tetrahydrophthalic acid and a diisocyanate are mixed at about 25° C. in about stoichiometric amounts in the presence of a suitable solvent or solvent mixture, such as xylene, glycol monoethyl ether acetate or mixture thereof. A catalyst, which preferably is an organo tin compound, e.g., dibutyl tin dilaurate, and the like, is desirably added with the polyester. The mixture is heated gradually to and is maintained at about 60° to 120° C. until the viscosity of the mass becomes constant. The resulting composition is then ready for use or it can be stored at ambient temperature for an indefinite period.

Any of a wide variety of organic isocyanates or mixtures thereof can be used in this instance. Liquid diisocyanates are preferred. As examples of this component, the following can be cited:

m- or p- phenylene diisocyanate
2,4-tolylene diisocyanate
2,6-tolylene diisocyanate
naphthalene-1,5-diisocyanate
4,4'-methylene-bis-(phenylisocyanate)
1,4-cyclohexyl diisocyanate
4,4'-methylene bis (cyclohexylisocyanate)

Mixtures of these and equivalent materials are contemplated also.

Polyesters derived from Δ4-tetrahydrophthalic acid are well known. They can be prepared in a conventional manner. Generally the esterification is carried out in the presence, or absence, of an organic solvent by heating a mixture of the acid (or anhydride) and polyfunctional alcohol until the desired degree of molecular weight increase, as measured by hydroxyl number and acid number, has been obtained.

In the present instance a portion of the Δ4-tetrahydrophthalic acid component can be replaced by an equivalent amount of a saturated dicarboxylic acid, such as phthalic, adipic, succinic, glutaric and the like saturated dicarboxylic acids. In such instances, the degree of improvement is lessened to a minor extent since the proportionate amounts of ethylenic double bonds has been reduced but the saturated dicarboxylic acid is desirable in minor amounts because it imparts generally increased toughness to the coating. Preferably, Δ4-tetrahydrophthalic acid is present in major amount and the saturated dicarboxylic acid is used in minor amount, desirably an amount equivalent to 5–25% of the Δ4-tetrahydrophthalic acid.

The polyfunctional alcohol component of the polyester can be selected from a wide variety of such reagents conventionally used in the preparation of polyesters. This component is preferably polyhydric and especially dihydric alcohols are used. Typical of members of this class of compounds include the following:

ethylene glycol
diethylene glycol
propylene glycol
1,4-butane diol
1,6-hexane diol
trimethylol propane
pentaerythritol
ethanolamine Mixtures of these and equivalent compounds are contemplated also.

The polyesterification is carried out in a known manner at temperatures within the range of about 140° and 250° C., preferably between about 170° and about 210° C. Water of esterification is removed continuously and this can be accelerated, especially as the reaction nears completion by the application of vacuum. The reaction can also be effected in whole or in part in the presence of an azeotropic solvent, such as xylene.

The reaction is carried out using an excess of the alcohol component so as to obtain a polyester of low acid number and hydroxyl end groups. The acid number is below 10 and preferably below 2. The hydroxyl number of the polyester should be at least 60 and preferably between 200 and 400.

The polyester, containing terminal hydroxyl groups, is then combined with a diisocyanate. This combination can be carried out in several ways known to the art. For example, to an organic solution of the polyester containing if desired a catalyst promoting urethane formation such as an organo-tin compound, an equivalent amount of the isocyanate is added. The combination is made at ambient temperature and the heat of reaction usually causes the temperature of the mixture to increase to 50° C. or above. The mixture is agitated preferably at a temperature within the range of 50° to 120° C. until the urethane reaction has been substantially completed. Conveniently, the course of the reaction can be followed by noting the viscosity of the mixture. When the viscosity becomes substantially constant, it may be concluded that the reaction has been substantially completed. The resultant reaction product contains no or insignificant amounts of free isocyanato and/or hydroxyl groups.

Alternatively, the polyester solution can be reacted with a slight excess, e.g. about 10% excess of the equivalent amount, of the isocyanate component. After the urethane reaction has been substantially completed the excess isocyanato groups are reacted with a "chain-extending" substance, e.g. water. This alternate procedure results in polymers of substantially equivalent character and moreover permits the reaction to proceed at a faster rate, due to the mass action of the excess isocyanato groups. Such slight excess amounts are intended to be included within the meaning of the expression "substantially stoichiometric equivalent quantities."

Typical of the organic solvents which can be used in this procedure are the following:

ethyl acetate
butyl acetate
cyclohexanone
glycol monoether acetate
toluene
xylene Mixtures of these solvents and equivalent compounds are contemplated in this connection also. The amount of solvent will depend on the concentration desired and can vary over a wide range. Usually sufficient solvent to produce a 20–60% solution will be satisfactory.

As mentioned above, a catalyst can be used to promote the urethane formation reaction. In addition to the known organo-tin compounds such as for example:

dibutyl tin dilaurate
tetra methyl tin
dimethyl dioctyl tin
di-lauryl tin difluoride
di-2-ethylhexyltin bis (monobutyl maleate)
tri-n-butyl tin acetonate tertiary amine, such as for example, N,N-dimethylpiperazine
triethylamine
N-methylmorpholine as well as mixtures of these and equivalent compounds can be used.

The coating compositions of the present invention, which may contain driers, pigments, fillers, flowing agents, other resins and the like conventional adjuvants, can be applied to any suitable substrate at room temperature or above. The coatings can be dried at room temperature or in conventional baking ovens in a manner well known in the lacquer art. The films prepared from the coating compositions of this invention dry "tack-free" in less than an hour and reach their maximum properties after one week or more at ambient temperature.

The following examples will illustrate the present invention. Parts and percentages are by weight and temperatures are given in degrees centigrade.

EXAMPLE I

Part A.—Preparation of polyester

A mixture of Δ4-tetrahydrophthalic anhydride (1 mol) and 1,2-propylene glycol (2 mols) was heated under reflux at 190° to 200° for 19 hours. Water formed in the esterification was removed from the refluxing condensate by means of a Dean-Stark water trap. Thereafter, the mass was cooled and xylene (about 10 mols) was added. The mixture was heated to and maintained at its refluxing temperature (185° to 190°) for six hours. The solvent was stripped from the batch in vacuo. The stripped freed residue had the following properties:

Hydroxyl number _____ 360
Acid number _____ 0.5
Percent solids _____ 85
Percent residual water _____ 0.05

Part B.—Preparation of coating composition

A mixture of 815 parts of the polyester prepared in Part A above, 0.56 part of dibutyl tin dilaurate, 928 parts of xylene and 1530 parts of glycol monoethyl ether acetate ("Cellosolve Acetate" urethane grade) was prepared and to it, at about 25°, 451 parts of a mixture of 80% 2,4-tolylene diisocyanate and 20% of 2,6-tolylene diisocyanate were added. The mixture was agitated in an atmosphere of nitrogen and its temperature rose spontaneously to about 65°. The batch was maintained at 65° to 70° for about 5 days at which time a constant viscosity of Q (Gardner-Holdt scale) had been attained. The resulting composition containing 30% solids, was applied to a wood surface by brushing and formed a tack-free coating in less than one hour.

EXAMPLE II

For comparison, an analogous coating composition to that prepared in Example I above, was prepared in which one mol of phthalic anhydride was used instead of Δ4-tetrahpdrophthalic. The resultant polyester had the following properties:

| | |
|---|---|
| Hydroxyl number | 298 |
| Acid number | 1.7 |
| Percent solids | 88 |
| Residual moisture, percent | 0.1 |

This was combined with tolylene diisocyanate as described in Part B of Example I using the following formulation:

| | |
|---|---|
| Polyester, parts | 932 |
| Tolylene diisocyanate, parts | 426 |
| "Cellosolve Acetate," parts | 1430 |
| Xylene | none |
| Dibutyl tin dilaurate | 1.8 |

The coating had a viscosity of G–H (Gardner-Holdt scale) and a solids content of 45%.

Each of the coating compositions prepared, as above, to which 0.05% cobalt and 0.5% lead naphthenate, as the the metal, based on non-volatile content, were added and the coatings applied to a wood panel by the knife coating technique. The properties of these coatings are set out in the following table.

TABLE I

| Property | Ex. I Coating | Ex. II Coating |
|---|---|---|
| Dry time: | | |
| Track free (hr.) | 0.7 | 1.7. |
| Dry through (hr.) | 1.5 | 3.2. |
| Sward hardness: | | |
| 24 hr. | 32 | 26. |
| 1 week | 44 | 32. |
| Mar resistance, 1 week | Fair | Very poor. |
| Resistance to cyclohexanone after 3 weeks air cure | Insoluble (hot). | Soluble (cold). |

The superiority of the coating derived from the polyester based on Δ4-tetrahydrophthalic acid with respect to dry time and to solvent resistance is clearly indicated by the data of the above table. The term Δ4-tetrahydrophthalic acid as used in the appended claims is intended to include Δ4-tetrahydrophthalic anhydride.

It can thus be seen that novel and eminently useful urethane coating compositions have been devised. The above example and the numerous variations alluded to in the above specification have been given for the purpose of illustrating the considerable scope of our invention. Other variations in the details given above can be made as will be obvious to those skilled in the art. Such variations which do not depart from the spirit of this invention are to be included within the scope of this invention which is limited only by the claims appended thereto.

We claim:

1. A liquid coating composition composed of an inert normally liquid organic solvent containing in solution as film former the reaction product of substantially stoichiometric equivalent quantities of an organic polyisocyanate and a hydroxyl terminated polyester having an acid number below 10 and a hydroxyl number of at least 60, said polyester obtained by condensation of a dibasic carboxylic acid component in which a major proportion of the dibasic carboxylic acid component is Δ4-tethahydrophthalic acid and a polyol, said film former being produced by maintaining said polyester and said organic polyisocyanate in the presence of an inert liquid organic solvent at a temperature of about 60° C. to 120° C. until the viscosity of the reaction mass becomes constant, said reaction mass being further characterized by the substantial absence of free-isocyanato and hydroxyl groups.

2. A coating composition as claimed in claim 1 wherein the organic polyisocyanate is tolylene diisocyanate.

3. A liquid coating composition composed of an inert normally liquid organic solvent containing in solution as film former the reaction product of substantially stoichiometric equivalent quantities of an organic polyisocyanate and a hydroxy terminated polyester having an acid number below 2 and a hydroxyl number between 200 and 400, said polyester obtained by condensation of a dibasic carboxylic acid component in which a major proportion of the dibasic carboxylic acid component is Δ4-tetrahydrophthalic acid and a polyol, said film former being produced by maintaining said polyester and said organic polyisocyanate in the presence of an inert liquid organic solvent at a temperature of about 60° C. to 120° C. until the viscosity of the reaction mass becomes constant, said reaction mass being further characterized by the substantial absence of free isocyanato and hydroxyl groups.

4. A method of preparing a coating composition which comprises admixing under anhydrous conditions substantially stoichiometric equivalent quantities of an organic polyisocyanate and a hydroxyl terminated polyester having an acid number below 10 and a hydroxyl number of at least 60, said polyester obtained by condensation of a dibasic carboxylic acid component in which a major proportion of the dibasic carboxylic acid component is Δ4-tetrahydrophthalic acid and a polyol, maintaining said mixture in the presence of an inert organic solvent at a temperature of about 60° C. to 120° C. until the viscosity of the reaction mass becomes constant to produce a reaction mass having substantially no free isocyanato and hydroxyl groups.

5. A process as claimed in claim 4 wherein the organic polyisocyanate is tolylene diisocyanate.

6. A method of preparing a coating composition which comprises admixing under anhydrous conditions substantially stoichiometric equivalent quantities of an organic polyisocyanate and a hydroxyl terminated polyester having an acid number below 2 and a hydroxyl number between 200 and 400, said polyester obtained by condensation of a dibasic carboxylic acid component in which a major proportion of the dibasic carboxylic acid component is Δ4-tetrahydrophthalic acid and a polyol, maintaining said mixture in the presence of an inert organic solvent at a temperature of about 60° C. to 120° C. until the viscosity of the reaction mass becomes constant to produce a reaction mass having substantially no free isocyanato and hydroxyl groups.

References Cited

UNITED STATES PATENTS

| | | | |
|---|---|---|---|
| 1,860,730 | 5/1932 | Brooks et al. | 260—75 |
| 2,676,164 | 4/1954 | Charlton | 260—75 |
| 2,910,381 | 10/1959 | Vogel | 260—75 |
| 2,916,403 | 12/1959 | Calderwood | 117—161 |
| 2,981,712 | 4/1961 | Harper | 260—75 |

OTHER REFERENCES

Dombrow: "Polyurethanes," Reinhold Publishing Co., pp. 134–146.

DONALD E. CZAJA, Primary Examiner.

LEON J. BERCOVITZ, Examiner.

J. J. KLOCKO, G. W. RAUCHFUSS,
Assistant Examiners.